L. W. SIMMONS.
DIRECTION INDICATING APPARATUS FOR AUTOMOBILES.
APPLICATION FILED JUNE 18, 1919.
1,379,130.
Patented May 24, 1921.
2 SHEETS—SHEET 1.
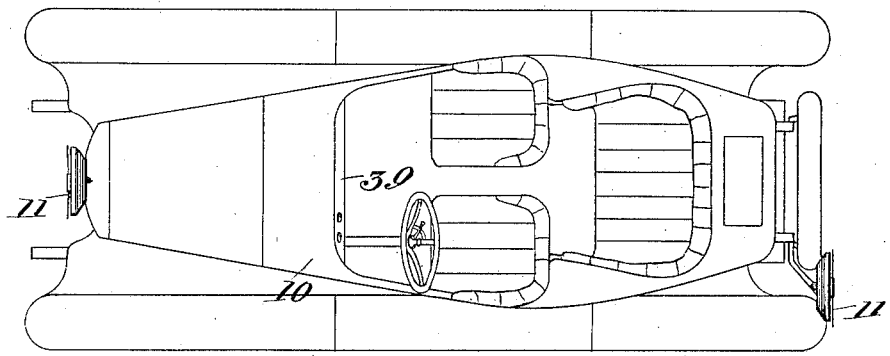
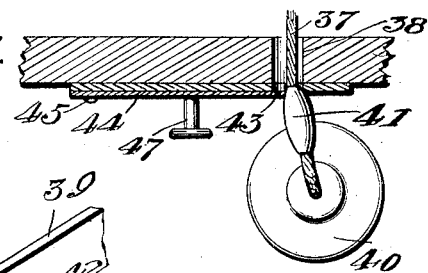
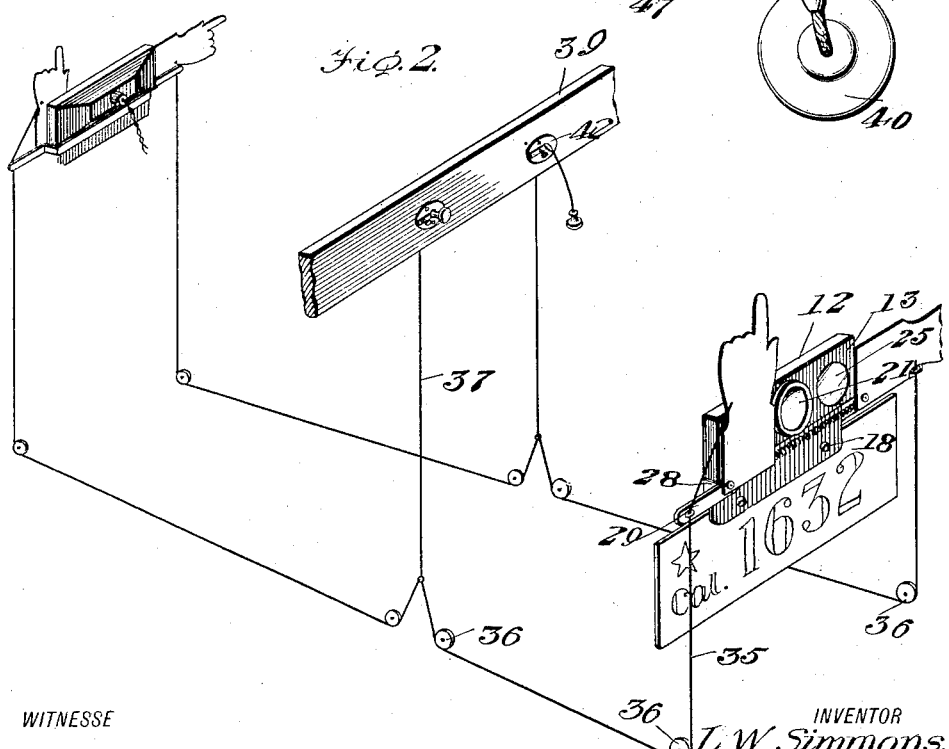
WITNESSE
R&Rousseau.
INVENTOR
L. W. Simmons,
BY
Munn &Co.
ATTORNEYS L. W. SIMMONS.
DIRECTION INDICATING APPARATUS FOR AUTOMOBILES.
APPLICATION FILED JUNE 18, 1919.
1,379,130.
Patented May 24, 1921.
2 SHEETS—SHEET 2.
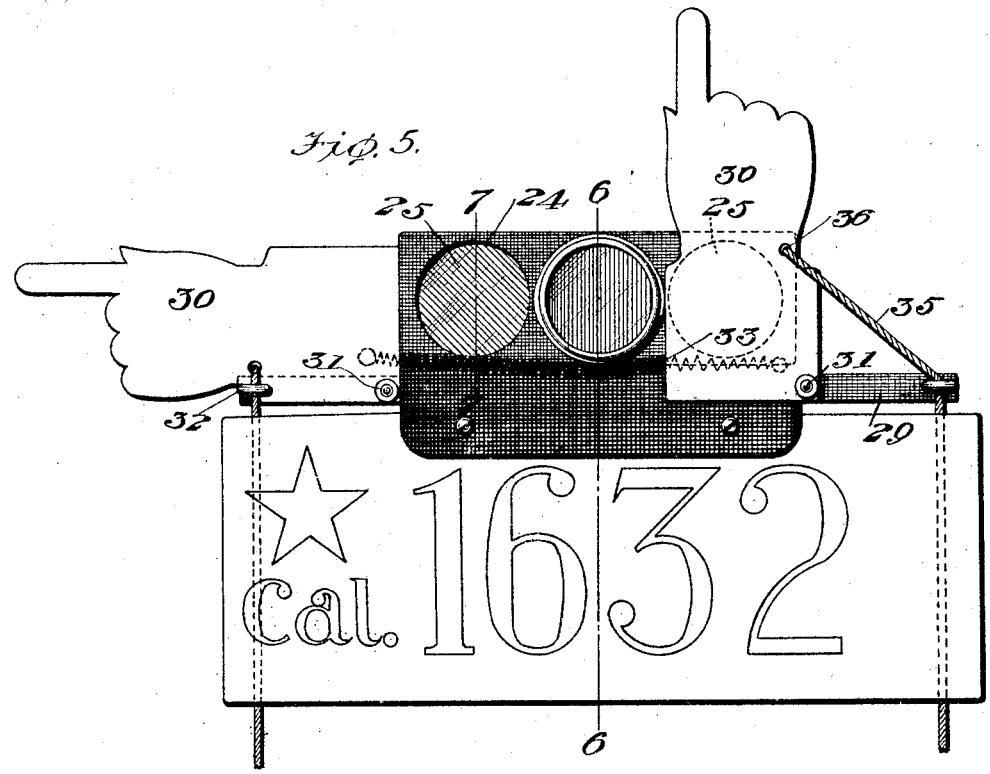
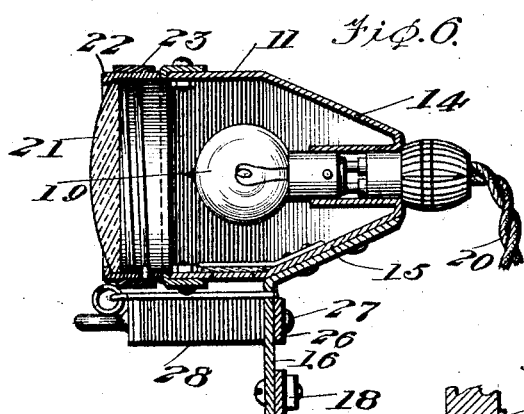
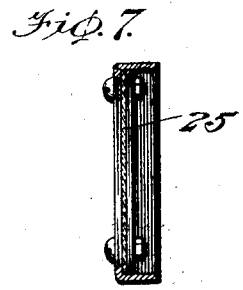
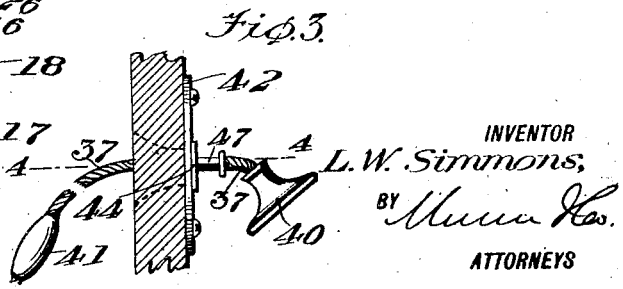
WITNESSE
R. E. Rousseau.
INVENTOR
L. W. Simmons,
BY
ATTORNEYS

UNITED STATES PATENT OFFICE.

LEON WILLIAM SIMMONS, OF LOS ANGELES, CALIFORNIA.

DIRECTION-INDICATING APPARATUS FOR AUTOMOBILES.

1,379,130.   Specification of Letters Patent.   Patented May 24, 1921.

Application filed June 18, 1919. Serial No. 304,993.

*To all whom it may concern:*

Be it known that I, LEON W. SIMMONS, a citizen of the United States, residing at Los Angeles, in the county of Los Angeles and State of California, have invented new and useful Improvements in Direction-Indicating Apparatus for Automobiles, of which the following is a specification.

My invention relates to direction indicating apparatus for use upon automobiles or other vehicles.

An important object of the invention is to provide means embodying a signal device arranged at the front or rear of an automobile, or both, for indicating the direction in which the automobile is to be turned or steered, such means being actuated by element or elements arranged on the dash or other conveniently located portion of the automobile.

A further object of the invention is to provide apparatus of the above mentioned character which is manually thrown into operation and automatically returned to the normal condition.

A further object of the invention is to provide apparatus of the above mentioned character, which is simple in construction, strong and durable.

Other objects and advantages of the invention will be apparent during the course of the following description.

In the accompanying drawings forming a part of this specification and in which like numerals are employed to designate like parts throughout the same, Figure 1 is a plan view of apparatus embodying my invention, showing the same applied to an automobile, Fig. 2 is a perspective view of the apparatus removed from the automobile, Fig. 3 is a side elevation of a latch to hold the cable in the outer position, Fig. 4 is a detailed section taken on line 4—4 of Fig. 3, Fig. 5 is a side elevation of a signaling device, Fig. 6 is a transverse sectional view taken on line 6—6 of Fig. 5, and, Fig. 7 is a detailed section taken on line 7—7 of Fig. 5.

In the drawings wherein for the purpose of illustration is shown a preferred embodiment of my invention, the numeral 10 designated an automobile, of any well known or preferred type, and 11 signal devices secured to the forward and rear ends thereof. These signal devices are identical and a detailed description of one will suffice for both.

Each signal device 11 embodies a casing 12, having a flat outer side or face 13, while its inner side 14 is preferably tapered, as shown. The casing 12 is rigidly secured to an angle plate 15, embodying a vertical depending portion 16. The plate 15 may be attached to the automobile by any suitable means, as through the medium of a bracket, thereby constituting means for connecting the device with the automobile. A number or license plate 17 may be secured to the depending portion 16, by bolts 18, as shown.

A source of light, preferably in form of an electric bulb 19, is disposed centrally within each casing 12 and receives current from a suitable circuit embodying wires 20, as clearly shown in Fig. 6.

Each casing 12 is provided in its outer flat face 13 with an inner opening, spanned by a lens 21. The lens 21 in the rear device 11 is preferably red, while the lens 21 in the forward device 11 is preferably yellow, while the invention is in no sense restricted to these colors. The lens 21 is held within a ring or sleeve 22, which is rigidly secured to the casing 12, such ring projecting outwardly beyond the face 13, for a substantial distance. A shock absorbing band 23 is carried by the ring 22 and is preferably formed of rubber or some other suitable elastic material.

Upon opposite sides of the lens 21, the face 13 is provided with outer openings 24, spanned by sections of glass 25, which are preferably green.

A strip or bar 26 is rigidly attached to the depending portion 16, as shown at 27, and the ends of this strip are bent outwardly forming lateral extensions 28, carrying longitudinal extensions 29.

The numerals 30 designate swinging indicating elements, preferably in the shape of a hand, and these elements are pivoted to the extensions 29, as shown at 31, to swing transversely of the automobile, or longitudinally of the casing 12, in proximity to the face 13. The pivots 31 are disposed adjacent to the lower edge of the indicating element, when it is swung downwardly. The indicating elements 30 cannot swing downwardly below a horizontal position, as they contact with guides or eyes 32, secured to the extensions 29. A retractile coil spring 33 is suitably connected with the indicating elements 30, as shown at 34 and serves to swing them inwardly to a vertical position, in contact with the shock absorbing element 23.

The indicating elements 30 have connections with flexible elements or cables 35, as shown at 36, these cables passing downwardly through the eyes 32. The cables 35 pass about pulleys 36, suitably connected with the automobile, and have connection with upwardly extending flexible elements or cables 37. These cables 37 extend through openings 38 in a dash 39 of the automobile. The cables 37 are provided at their free ends with knobs or handles 40 suitably attached thereto and inwardly of these knobs or handles with enlargements or buttons 41, suitably attached thereto. The buttons 41 are adapted to pass through the openings 38, while the knobs 40 cannot pass through the same.

The numeral 42 designates a plate secured to the dash 39 and having an opening 43 in registration with the opening 38. A spring latch 44 is attached to the plate 42, as shown at 45 and this latch has a forked head 46 to engage the button 41 and to receive the cable 37, thereby serving to prevent the button passing into the opening 43. A handle 47 is carried by the latch 44 and serves to move it.

The operation of the apparatus is as follows:

When the signal devices are in the normal or neutral condition, as when the automobile is traveling in a straight course, the indicating elements 30 of both signal devices are vertically arranged, thereby covering the openings 24. If it is desired to turn the automobile to the right, the operator pulls the knob 40 to the right until the button 41 engages behind the latch 44 and is held thereby, as indicated in Fig. 2. The cable 37 to the right pulls the cables 35, which in turn swing the indicating elements 30 outwardly to a horizontal position, to point to the right, at the same time uncovering the openings 24. By pulling the latch 45 the button 41 is released and the springs 33 automatically return the indicating elements 30 to the elevated positions. When the automobile is turned to the left the knob 40 to the left is pulled, as is obvious.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention I claim:

1. In apparatus of the character described, casings secured to the ends of an automobile, each casing having a flat face provided with a center opening and outer openings arranged upon the opposite sides of the inner opening, a collar surrounding the center opening and secured to the flat face and projecting outwardly beyond the same, a lens in the collar, sections of glass spanning the outer openings, a supporting element secured to the casing and projecting beyond the ends thereof, indicating elements pivotally connected with the supporting element and normally adapted to assume substantially vertical positions to cover the outer openings, a shock absorbing band carried by the collar to engage with the indicating elements, a spring connecting the indicating elements, combined stops and guides carried by the supporting element and arranged in the path of travel of the indicating elements, and means for operating the indicating elements.

2. In apparatus of the character described, casings secured to the ends of an automobile, each casing having a face provided with an inner opening and outer openings, a collar carried by the casing and surrounding the inner opening, a lens spanning the inner opening, sections of glass spanning the outer openings, indicating elements pivotally connected with the casing and adapted to be swung upwardly to cover the outer openings, a shock absorbing band carried by the collar to engage with the indicating elements, a retractile coil spring connecting the indicating elements to swing them upwardly, and means to swing the indicating element downwardly.

3. In apparatus of the character described, casings secured to the ends of an automobile, each casing being provided with an inner opening and outer openings, a collar carried by the casing and surrounding the inner opening, sections of transparent material spanning the openings, a source of light within each casing, indicating elements pivotally connected with the casing and adapted to be swung upwardly to cover the outer openings, a shock absorbing band carried by the collar to engage the indicating elements, yielding means to swing the indicating elements upwardly, and separate means to swing the indicating elements downwardly.

4. In apparatus of the character described, a casing, a collar carried thereby, a section of transparent material spanning the opening of the collar, a source of light within the casing, indicating elements arranged upon opposite sides of the collar and pivotally connected with the casing, an elastic element connecting the indicating elements to move them toward the collar, a shock absorbing element carried by the collar to engage the indicating elements, and means to move the indicating elements downwardly.

LEON WILLIAM SIMMONS.